(12) United States Patent
Wu

(10) Patent No.: US 10,154,523 B2
(45) Date of Patent: Dec. 11, 2018

(54) DEVICE AND METHOD OF AGGREGATING LTE SYSTEM AND WLAN

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 232 days.

(21) Appl. No.: 15/176,176

(22) Filed: Jun. 8, 2016

(65) Prior Publication Data

US 2016/0366720 A1    Dec. 15, 2016

Related U.S. Application Data

(60) Provisional application No. 62/173,910, filed on Jun. 10, 2015, provisional application No. 62/195,272, (Continued)

(51) Int. Cl.
*H04W 76/02* (2009.01)
*H04W 28/02* (2009.01)
(Continued)

(52) U.S. Cl.
CPC ..... *H04W 76/028* (2013.01); *H04W 28/0236* (2013.01); *H04W 36/30* (2013.01); *H04W 76/18* (2018.02); *H04W 76/19* (2018.02); *H04W 88/06* (2013.01); *H04W 36/14* (2013.01); *H04W 84/12* (2013.01)

(58) Field of Classification Search
CPC ... H04W 76/028; H04W 76/18; H04W 76/19; H04W 28/0236; H04W 36/30; H04W 88/06; H04W 36/40; H04W 84/12; H04L 9/14; H04L 61/6022; H04L 63/18; H04L 1/1812

See application file for complete search history.

(56) References Cited

U.S. PATENT DOCUMENTS

2013/0083783 A1* 4/2013 Gupta ............... H04W 4/70
370/338
2014/0050320 A1* 2/2014 Choyi ............... H04L 63/08
380/270

(Continued)

OTHER PUBLICATIONS

Steve Hratko, "Getting engaged:LTE and Wi-Fi Fall in Love"—The Rukus Room, Apr. 7, 2015, pp. 1-4.*

(Continued)

*Primary Examiner* — Afsar M Qureshi
(74) *Attorney, Agent, or Firm* — Winston Hsu

(57) ABSTRACT

A communication device for handling long-term evolution (LTE)-wireless local area network (WLAN) aggregation is configured to execute instructions comprising connecting to a base station (BS) via LTE communication; detecting a radio link failure on the LTE communication; stopping transmission/reception of at least one first LTE protocol data unit (PDU) via a WLAN in response to the radio link failure, if the WLAN is configured by the BS for the transmission/reception of the at least one first LTE PDU with the BS via the WLAN; and keeping transmission/reception of at least one non-LTE PDU via the WLAN in response to the radio link failure, if the WLAN is not configured by the BS for the transmission/reception of the at least one first LTE PDU with the BS via the WLAN.

16 Claims, 6 Drawing Sheets

Related U.S. Application Data filed on Jul. 21, 2015, provisional application No. 62/198,143, filed on Jul. 29, 2015.

(51) Int. Cl.
| | |
|---|---|
| *H04W 88/06* | (2009.01) |
| *H04W 36/30* | (2009.01) |
| *H04W 76/19* | (2018.01) |
| *H04W 76/18* | (2018.01) |
| H04W 84/12 | (2009.01) |
| H04W 36/14 | (2009.01) |

(56) References Cited

U.S. PATENT DOCUMENTS

| | | | | |
|---|---|---|---|---|
| 2015/0049707 A1* | 2/2015 | Vajapeyam | ............ | H04W 24/10 370/329 |
| 2016/0234752 A1* | 8/2016 | Hsu | ...................... | H04L 12/4641 |
| 2016/0338068 A1* | 11/2016 | Cheng | ................... | H04W 28/08 |
| 2016/0338074 A1* | 11/2016 | Chou | ..................... | H04W 76/27 |
| 2016/0338102 A1* | 11/2016 | Nuggehalli | ......... | H04L 12/4645 |

OTHER PUBLICATIONS

Search Report dated Nov. 7, 2016 for EP application No. 16173710.1, pp. 1-11.
Steve Hratko, "Getting Engaged: LTE and Wi-Fi Fall in Love—The Ruckus Room", http://www.theruckusroom.net, Apr. 7, 2015 (Apr. 7, 2015), pp. 1-4, XP055314634, Retrieved from the Internet: URL: http://www.theruckusroom.net/2015/04/getting-engaged-lte-and-wi-fi-falling-in-love.html.
RAN2, "LS on authentication and encryption between UE and WLAN for aggregation", 3GPP TSG-RAN WG2 Meeting #90, R2-152915, May 25-29, 2015, Fukuoka, Japan, XP050983982, pp. 1-2.
Office action dated Aug. 14, 2017 for the Taiwan application No. 105118303, filing date Jun. 13, 2016, pp. 1-16.
Office action dated Sep. 28, 2017 for EP application No. 16173710.1, pp. 1-12.
3GPP TS 36.331 V12.0.0 (Dec. 2013), "3rd Generation Partnership Project; Technical Specification Group Radio Access Network; Evolved Universal Terrestrial Radio Access (E-UTRA); Radio Resource Control (RRC); Protocol specification (Release 12)", XP050729407, pp. 1-349.
Kyocera, "Scenario and Protocol architecture of LTE-WLAN aggregation", 3GPP TSG-RAN WG2 #89-bis, R2-151538, Apr. 20-24, 2015, Bratislava, Slovakia, XP050936455, pp. 1-7.
Lauro Ortigoza: "Expert Opinion Drop Sessions (Part 1 of 2)", Mar. 28, 2012 (Mar. 28, 2012), pp. 1-5, XP055408958.
A. Schumacher et al.: "WLAN Traffic Offload in LTE White Paper", Nov. 21, 2012 (Nov. 21, 2012), pp. 1-32, XP055409125.
3GPP TS 36.300 V12.5.0 (Mar. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).
3GPP TS 36.321 V12.5.0 (Mar. 2015) Technical Specification 3rd Generation Partnership Project; Technical Specification Group Radio Access Network; Evolved Universal Terrestrial Radio Access (E-UTRA); Medium Access Control (MAC) protocol specification (Release 12).
3GPP TS 36.323 V12.3.0 (Mar. 2015) Technical Specification 3rd Generation Partnership Project; Technical Specification Group Radio Access Network; Evolved Universal Terrestrial Radio Access (E-UTRA); Packet Data Convergence Protocol (PDCP) specification (Release 12).
3GPP TS 36.331 V12.5.0 (Mar. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 12).
3GPP TS 36.300 V12.6.0 (Jun. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).
3GPP TS 36.321 V12.6.0 (Jun. 2015) Technical Specification 3rd Generation Partnership Project; Technical Specification Group Radio Access Network; Evolved Universal Terrestrial Radio Access (E-UTRA); Medium Access Control (MAC) protocol specification (Release 12).
3GPP TS 36.331 V12.6.0 (Jun. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 12).
3GPP TS 36.323 V12.4.0 (Jun. 2015) Technical Specification 3rd Generation Partnership Project; Technical Specification Group Radio Access Network; Evolved Universal Terrestrial Radio Access (E-UTRA); Packet Data Convergence Protocol (PDCP) specification (Release 12).
3GPP TS 33.234 V12.1.0 (Sep. 2014) Technical Specification 3rd Generation Partnership Project; Technical Specification Group Services and System Aspects; 3G Security; Wireless Local Area Network (WLAN) interworking security (Release 12).
3GPP TSG-RAN WG2 Meeting #90 R2-152655 Fukuoka, Japan, May 25-29, 2015 Agenda Item: 7.6.2.1 Source: Huawei, HiSilicon Title: Authentication and encryption between UE and WLAN for aggregation Document for: Approval.
3GPP TSG RAN WG2 Meeting #90 R2-152125 Fukuoka, Japan, May 25-29, 2015 Agenda item: 7.6.2.1 Source: CATT Title: Discussion on Architectural and Procedure of C-plane for LTE-WLAN Aggregation Document for: Discussion and Decision.
3GPP TSG RAN WG2 Meeting #90 R2-152126 Fukuoka, Japan, May 25-29, 2015 Source: CATT Title: Discussion on mobility procedures of aggregation bearer Agenda Item: 7.6.2.1 Document for: Discussion and Decision.

* cited by examiner

DEVICE AND METHOD OF AGGREGATING LTE SYSTEM AND WLAN

CROSS REFERENCE TO RELATED APPLICATIONS

This application claims the benefit of U.S. Provisional Application No. 62/173,910 filed on Jun. 10, 2015, U.S. Provisional Application No. 62/195,272 filed on Jul. 21, 2015, and U.S. Provisional Application No. 62/198,143 filed on Jul. 29, 2015, which are incorporated herein by reference.

BACKGROUND OF THE INVENTION

1. Field of the Invention

The present invention relates to a device and a method used in a wireless communication system, and more particularly, to a device and a method of aggregating a long term evolution (LTE) system and a wireless local area network (WLAN).

2. Description of the Prior Art

Long term evolution (LTE)-wireless local area network (WLAN) aggregation is used for increasing data rate. The eNB transmits/receives data via both LTE communication and WLAN communication to/from the UE.

However, there are several problems to be solved when realizing LTE-WLAN aggregation. In one example, it is unknown whether/how to perform LTE-WLAN aggregation, when a WLAN function of the UE is enabled/disabled via a user interface of the UE. In one example, a header compression protocol used between the UE and the eNB may be reset, after performing a radio resource control (RRC) procedure. The UE and the eNB cannot process received packets correctly, if the header compression protocol is not reestablished. In one example, it is unknown how the UE should operate, when a radio link failure is detected on a WLAN connection. In one example, an access point (AP) of the WLAN may transmit one more packets to the UE without receiving any acknowledgement from the UE. This may cause problem to the operation to the AP, e.g., waste of resources.

Thus, how to handle the LTE-WLAN aggregation is an important problem to be solved.

SUMMARY OF THE INVENTION

The present invention therefore provides a communication device and method for aggregating a LTE system and a WLAN to solve the abovementioned problem.

A communication device for handling long-term evolution (LTE)-wireless local area network (WLAN) aggregation comprises a storage unit for storing instructions and a processing means coupled to the storage unit. The processing means is configured to execute the instructions stored in the storage unit. The instructions comprise connecting to a base station (BS) via LTE communication; detecting a radio link failure on the LTE communication; stopping transmission/reception of at least one first LTE protocol data unit (PDU) via a WLAN in response to the radio link failure, if the WLAN is configured by the BS for the transmission/reception of the at least one first LTE PDU with the BS via the WLAN; and keeping transmission/reception of at least one non-LTE PDU via the WLAN in response to the radio link failure, if the WLAN is not configured by the BS for the transmission/reception of the at least one first LTE PDU with the BS via the WLAN.

A communication device for handling long-term evolution (LTE)-wireless local area network (WLAN) aggregation comprises a storage unit for storing instructions and a processing means coupled to the storage unit. The processing means is configured to execute the instructions stored in the storage unit. The instructions comprise entering a connected mode with a LTE network; receiving a first radio resource control (RRC) message configuring a communication of at least one LTE protocol data unit (PDU) with a WLAN from the LTE network in the connected mode; connecting to the WLAN; performing a communication of at least one WLAN media access control (MAC) PDU comprising the at least one LTE PDU with the WLAN; performing a RRC connection reestablishment or a handover with the LTE network in the connected mode; and suspending the communication of the at least one LTE PDU with the WLAN in response to the RRC connection reestablishment or the handover.

A communication device for handling long-term evolution (LTE)-wireless local area network (WLAN) aggregation comprises a storage unit for storing instructions and a processing means coupled to the storage unit. The processing means is configured to execute the instructions stored in the storage unit. The instructions comprise establishing a LTE connection to a LTE network; receiving a radio resource control (RRC) message configuring a communication of at least one LTE protocol data unit (PDU) with a WLAN via the LTE connection from the LTE network; establishing a WLAN connection to the WLAN; generating a first encryption key in response to a first handshake procedure with the WLAN; detecting a disconnection of the WLAN connection; generating a first LTE PDU which comprises a first LTE service data unit (SDU) according to a first LTE PDU format; encrypting a first WLAN media access control (MAC) SDU which comprises the first LTE PDU according to the first encryption key, to obtain an encrypted first WLAN MAC SDU; failing to transmit a first WLAN MAC PDU which comprises the encrypted first WLAN MAC SDU to the WLAN via the WLAN connection due to the disconnection of the WLAN connection; and transmitting a second LTE PDU which comprises the first LTE SDU via the LTE connection according to a second LTE PDU format, wherein the first LTE PDU format is different from the second LTE PDU format.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
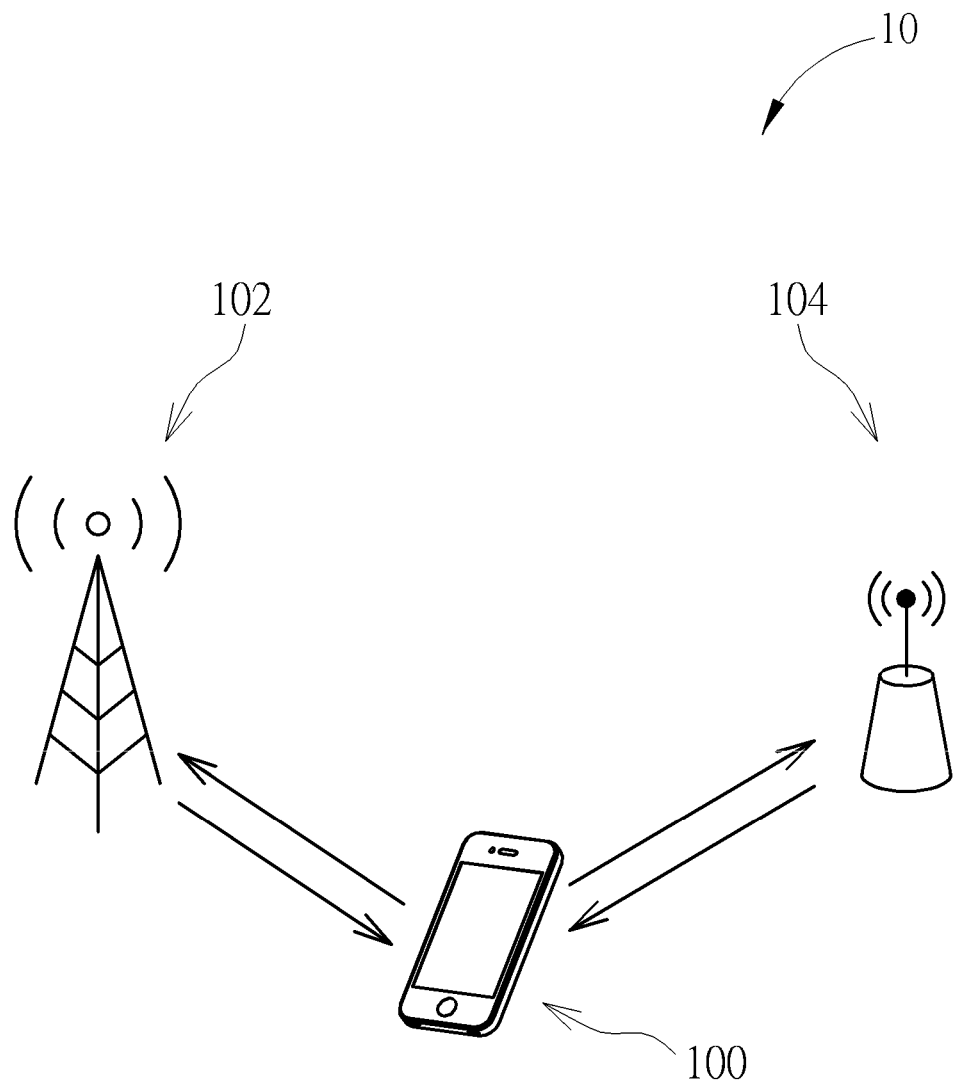
FIG. 1 is a schematic diagram of a wireless communication system according to an example of the present invention.

FIG. 1 is a schematic diagram of a wireless communication system 10 according to an example of the present invention. The wireless communication system 10 is briefly composed of a user equipment (UE) 100, a base stations (BS) 102 and an access point (AP) 104. In FIG. 1, the UE 100, the BS 102 and the AP 104 and are simply utilized for illustrating the structure of the wireless communication system 10. Practically, the BS 102 may be an evolved Node-B (eNB) in an evolved universal terrestrial radio access network (E-UTRAN), a long term evolution (LTE) system, a LTE-Advanced (LTE-A) system, an evolution of the LTE-A system, or a fifth generation (5G) system employing orthogonal frequency-division multiplexing (OFDM) and/or non-OFDM and a transmission time interval (TTI) shorter than 1 millisecond (e.g., 100 or 200 microseconds). The AP 104 may be operated according to wireless local area network (WLAN) standards such as Institute of Electrical and Electronics Engineers (IEEE) 802.11 standard(s), such as IEEE 802.11a, IEEE 802.11n, IEEE 802.11ac and/or IEEE 802.11ax. Note that the BS 102 and AP 104 may be collocated or non-collocated.

As shown in FIG. 1, the UE 100 is configured to communicate with the BS 102 and/or the AP 104. That is, the UE 100 performs transmission/reception via the BS 102 and/or the AP 104. For example, the UE 100 transmits and/or receives packets (e.g., protocol data units (PDUs)) to and/or from the BS 102 directly and/or via the AP 104.

The UE 100 may be a mobile phone, a laptop, a tablet computer, an electronic book, a portable computer system, a vehicle, or an aircraft. For uplink, the UE 100 is the transmitter and the BS 102 and/or the AP 104 is the receiver, and for downlink, the BS 102 and/or the AP 104 is the transmitter and the UE 100 is the receiver.

Figure 2:
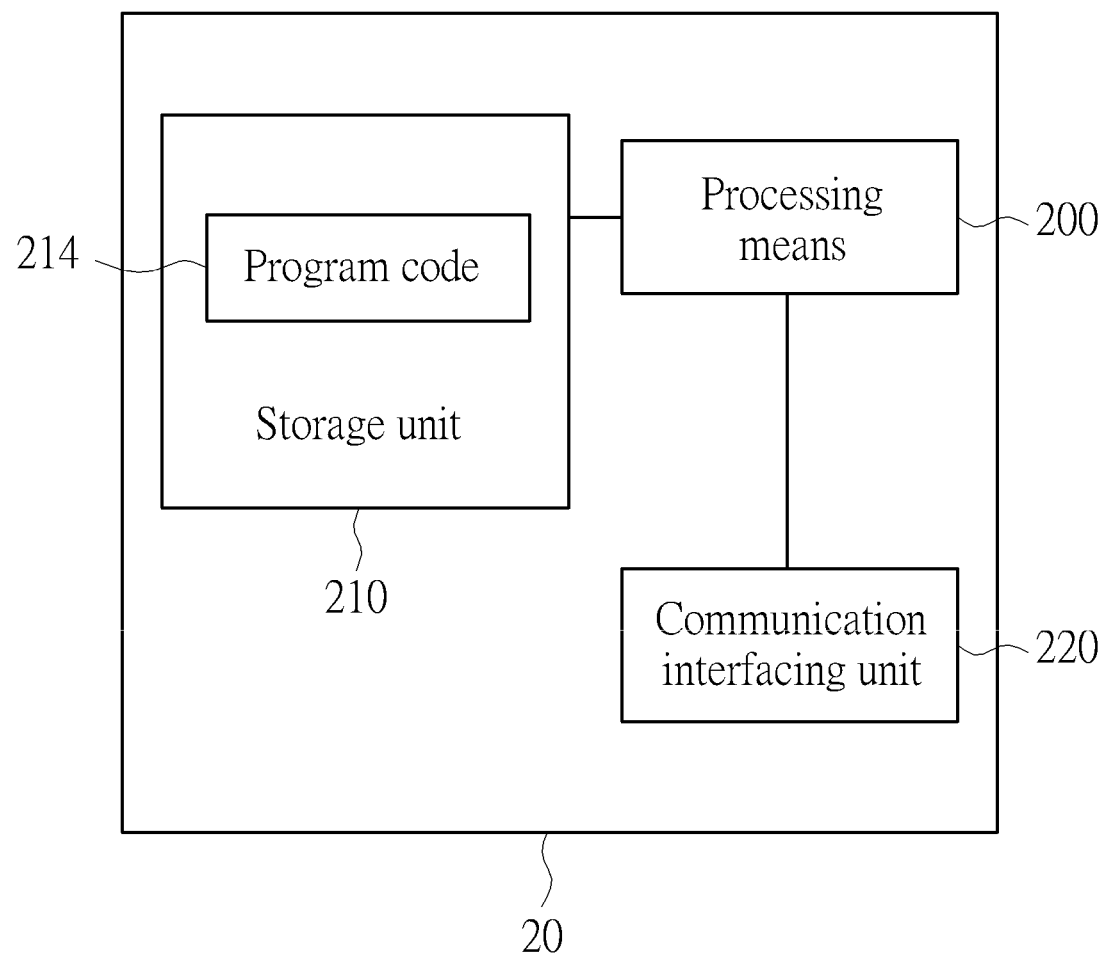
FIG. 2 is a schematic diagram of a communication device according to an example of the present invention.

FIG. 2 is a schematic diagram of a communication device 20 according to an example of the present invention. The communication device 20 may be the UE 100, the BS 102 and/or the AP 104 shown in FIG. 1, but is not limited herein. The communication device 20 includes a processing means 200 such as a microprocessor or Application Specific Integrated Circuit, a storage unit 210 and a communication interfacing unit 220. The storage unit 210 may be any data storage device that stores a program code 214, accessed and executed by the processing means 200. Examples of the storage unit 210 include but are not limited to read-only memory, flash memory, random-access memory, hard disk, optical data storage device, non-volatile storage unit, non-transitory computer-readable medium (e.g., tangible media), etc. The communication interfacing unit 220 is preferably a transceiver used to transmit and receive signals (e.g., data, signals, messages and/or packets) according to processing results of the processing means 200.

Figure 3:
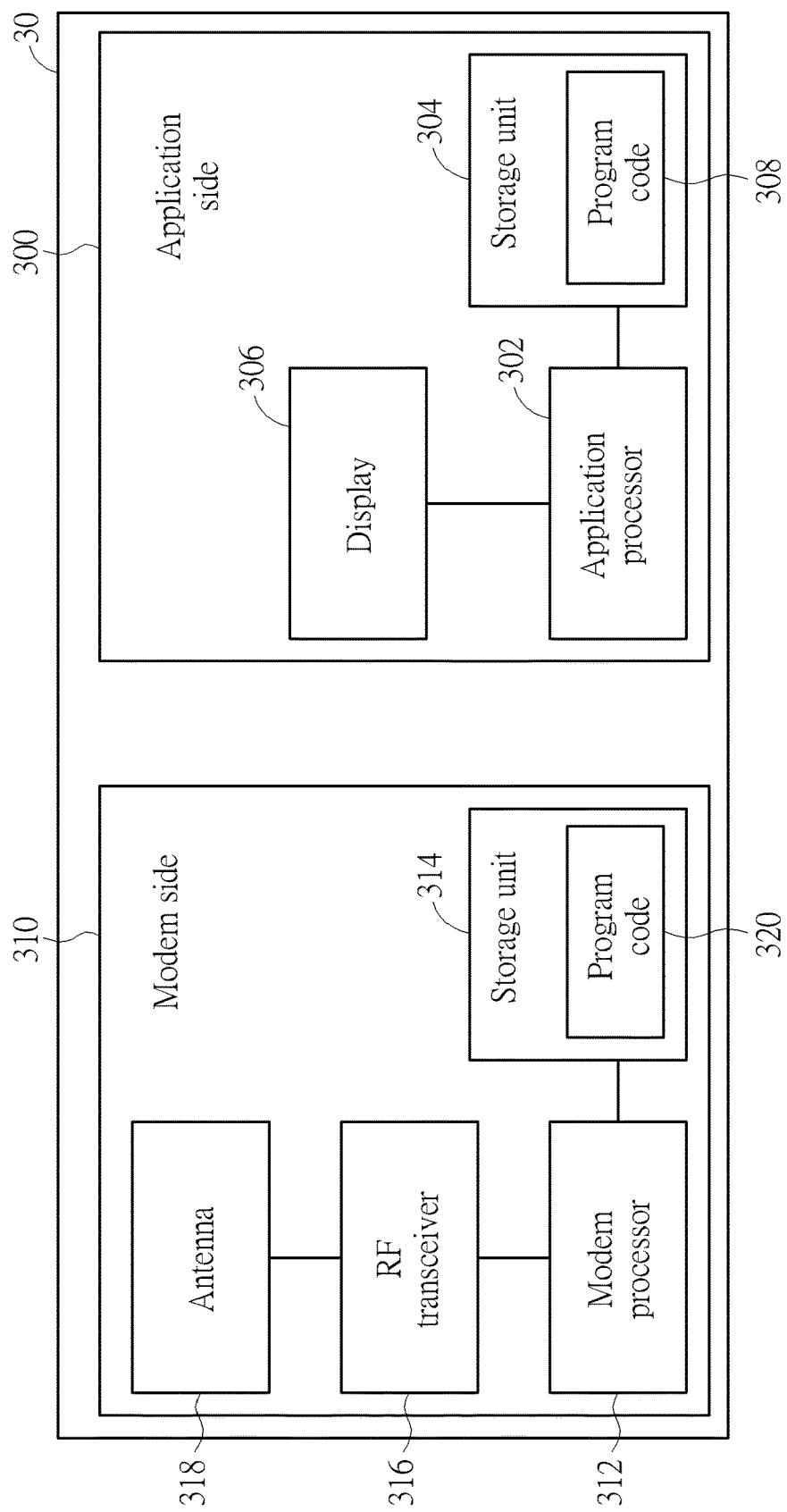
FIG. 3 is a schematic diagram of a communication device according to an example of the present invention.

FIG. 3 is a schematic diagram of a communication device 30 according to an embodiment of the present invention. The communication device 30 may be the communication device 100, the BS 102 or the AP 104 shown in FIG. 1, but is not limited herein. The communication device 30 may include an application side (APS) 300 (e.g., application module) and a modem side (MDS) 310 (e.g., modem module), which may communicate with each other. The APS 300 may include an application processor 302, an application storage unit 304, and a display 306. The MDS 310 may include a modem processor 312, a modem storage unit 314, a radio frequency (RF) transceiver 316, and an antenna 318. The application processor 302 may run an operating system (OS) (e.g., an Android OS, a Windows phone 7 OS, or an iPhone OS (iOS)) to control the display 306 to display software applications and a user interface (UI). The modem processor 312 may run communication protocols to support wireless communication technologies of LTE/5G/WLAN. The application storage unit 304 and the modem storage unit 314 may be any data storage device that stores program codes 308 and 320, accessed and executed by the application processor 302 and the modem processor 312, respectively. Examples of the application storage unit 304 and the modem storage unit 314 include but are not limited to a ROM, flash memory, RAM, hard disk, optical data storage device, non-volatile storage unit, non-transitory computer-readable medium (e.g., tangible media), cloud storage, etc. The application storage unit 304 and the modem storage unit 314 may share a same data storage device, e.g., the same data storage device may have two partitions. The RF transceiver 318 may be used for communicating with other communication devices wirelessly and may transform processing results from the modem processor 312 into radio signals. Examples of the display 306 are realized but are not limited to a liquid crystal display (LCD), an e-paper display, a touch control display, or any other suitable display device.

In the following embodiments, a UE is used to represent a communication device in FIG. 1 and "LTE" is used to simplify the illustration of the embodiments. The "LTE" should not be a restriction to the invention scope and may be replaced by "5G".

Figure 4:
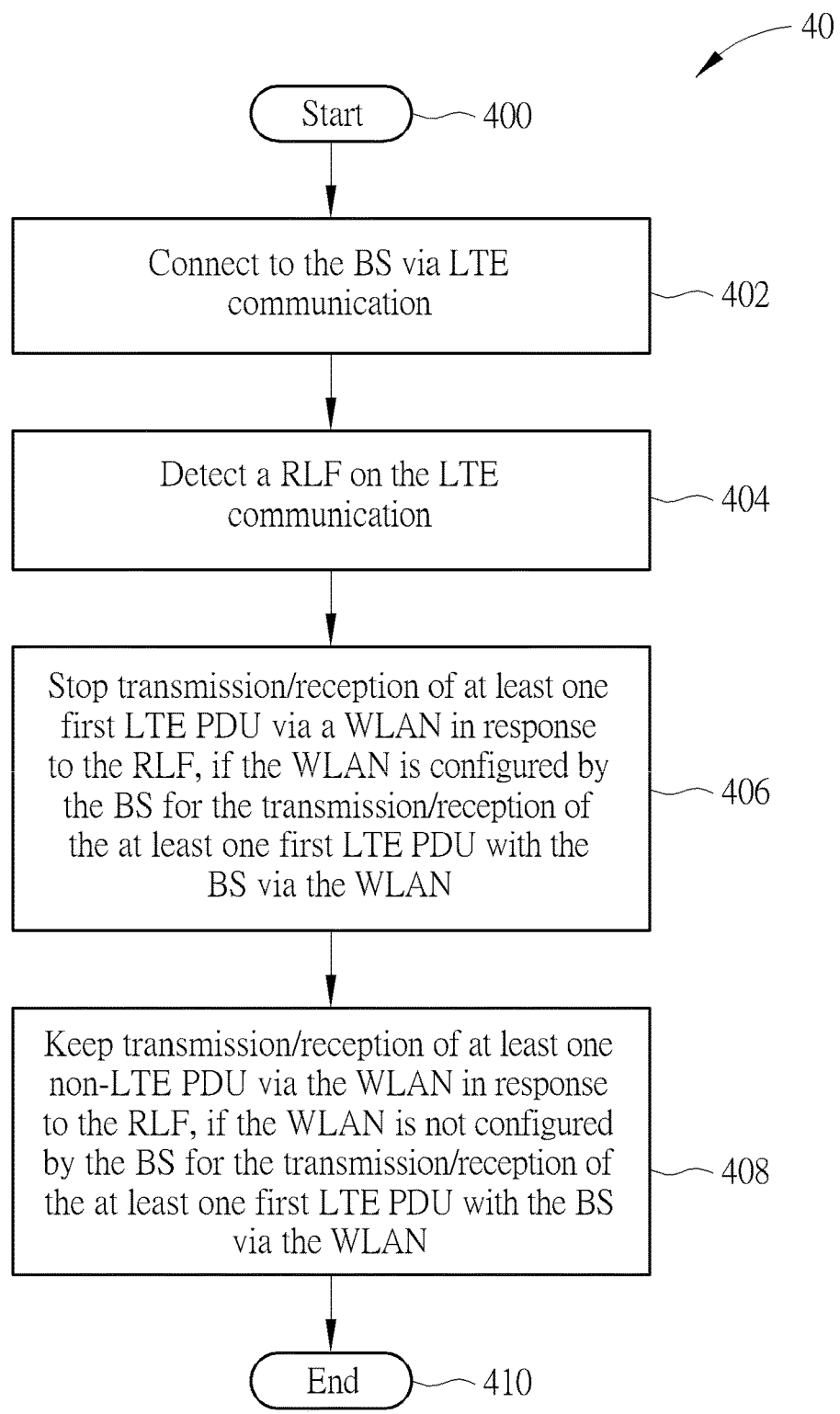
FIG. 4 is a flowchart of a process according to an example of the present invention.

FIG. 4 is a flowchart of a process 40 according to an example of the present invention. The process 40 may be utilized in a UE (e.g., the UE 100), for aggregating LTE and WLAN (e.g., WiFi) communications. The process 40 may be compiled into the program code 214 and includes the following steps:

Step 400: Start.

Step 402: Connect to the BS via LTE communication.

Step 404: Detect a radio link failure (RLF) on the LTE communication.

Step 406: Stop transmission/reception of at least one first LTE PDU via a WLAN in response to the RLF, if the WLAN is configured by the BS for the transmission/reception of the at least one first LTE PDU with the BS via the WLAN.

Step 408: Keep transmission/reception of at least one non-LTE PDU via the WLAN in response to the RLF, if the WLAN is not configured by the BS for the transmission/reception of the at least one first LTE PDU with the BS via the WLAN.

Step 410: End.

According to the process 40, the UE connects to the BS (e.g., the BS 102) via LTE communication. The UE detects a RLF on the LTE communication. The UE stops transmission/reception of at least one first LTE PDU via the WLAN (e.g., the AP 104) in response to the RLF, if the WLAN is configured by the BS for the transmission/reception of the at least one first LTE PDU with the BS via the WLAN, i.e., LTE-WLAN aggregation. The UE keeps transmission/reception of at least one non-LTE PDU via the WLAN in response to the RLF, if the WLAN is not configured by the BS for the transmission/reception of the at least one first LTE PDU with the BS via the WLAN. That is, the UE does not stop the transmission/reception, if the WLAN is not related to the failed LTE connection. In one example, the WLAN not configured by the BS may be selected by the UE, e.g., selected by a user or by a selection application in an operating system (e.g., Android or iOS).

Realization of the process 40 is not limited to the above description. The following examples may be applied to the process 30.

In one example, the UE transmits a message indicating support of LTE-WLAN aggregation to the BS via the LTE communication. The UE receives a first configuration message (e.g., RRCConnectionReconfiguration) configuring the transmission/reception of the at least one first LTE PDU via the WLAN and a WLAN configuration, i.e. LTE-WLAN aggregation. Then, the UE communicates the at least one first LTE PDU to/from the BS via the WLAN according to the WLAN configuration. Further, the UE detects a disconnection of the WLAN, e.g., detects that the WLAN is lost. The UE starts a timer in response to the disconnection. Then, the UE stops the timer in response to the RLF. The UE performs a radio resource control (RRC) connection reestablishment procedure in response to the RLF.

In one example, a LTE modem side of the UE sends an indication to an application side of the UE in response to the RLF, and the application side determines whether to stop or keep the transmission/reception via a WLAN in response to the indication and according to whether the WLAN is configured by the BS or not. The application side disables the WLAN function of the UE to stop the transmission/reception via the WLAN. The disabling includes turning off WLAN chip(s) such as baseband IC/chip, RF IC/chip and/or transceivers, or changing the WiFi chip(s) from a normal power state to a low power state or from a normal operation mode to a sleep mode. The low power state/sleep mode consumes lower power than the normal power state/normal operation mode.

In another example, a LTE modem side of the UE sends an indication to a WLAN modem side of the UE in response to the RLF, and the WLAN modem side determines whether to stop or keep the transmission/reception via the WLAN in response to the indication and according to whether the WLAN is configured by the BS or not. In another example, a LTE modem side of the UE indicates a WLAN modem side of the UE in response to the RLF to stop the transmission/reception via the WLAN. In another example, a LTE modem side of the UE stops the transmission/reception via the WLAN in response to the RLF.

In one example, the UE transmits a second message indicating a disconnection of the WLAN to the BS via the LTE communication, when the UE detects the disconnection. In one example, the WLAN configuration includes a WLAN identity such as a Service Set Identifier (SSID) of the WLAN, a Basic Service Set Identifier (BSSID) of the WLAN and/or a Homogenous Extended Service Set Identifier (HESSID) of the WLAN. The UE may connect to the WLAN broadcasting the WLAN identity, after the UE receives the WLAN configuration.

According to the above example, when the BS receives the second message, the BS stops transmitting LTE PDU(s) to the UE via the WLAN. The BS may or may not transmit a second configuration message (e.g., RRCConnectionReconfiguration message) releasing the LTE-WLAN aggregation or reconfiguring a data radio bearer (DRB) of which the at least one first LTE PDU via the LTE communication instead of the WLAN communication, to the UE.

In one example, the UE transmits a third message indicating that a connection of the WLAN is recovered to the BS via the LTE communication, when the UE reconnects to the WLAN or another WLAN having an identification the same as an identification of the WLAN. The BS may not transmit the second configuration message (e.g., RRCConnectionReconfiguration message) releasing the WLAN configuration to the UE in response to the second message. Thus, the BS starts transmitting LTE PDU(s) via the WLAN or the other WLAN, when the BS receives the third message.

In one example, the UE receives at least one second LTE PDU from the BS via the LTE communication, wherein the at least one first LTE PDU and the at least one second LTE PDU belong to a same data radio bearer or a same packet data convergence protocol (PDCP) entity. In other words, the BS transmits the at least one second LTE PDU via the LTE communication to the UE in response to the second message or when receiving the second message. The at least one second LTE PDU includes at least one of the at least one first LTE PDU for retransmission or includes new LTE PDCP SDU(s). Further, the at least one first LTE PDU may be encapsulated in at least one third LTE PDU by the BS, the at least one second LTE PDU is encapsulated in at least one fourth LTE PDU, and a format of the at least one third LTE PDU and a format of the at least one fourth LTE PDU are different.

In one example, the UE stops the transmission/reception of the at least one first LTE PDU via the WLAN, when the communication detects the disconnection of the WLAN. When the UE detects the disconnection, the UE needs to scan one or more WLAN channels (e.g. carrier frequencies) to find the WLAN or another WLAN which have the SSID, the BSSID and/or the HESSID configured by the WLAN configuration.

In one example, the first message or the second message may be a RRC message, a PDCP Control PDU or a media access control (MAC) control element. In one example, the UE may transmit a status report indicating which of the at least one first LTE PDU is received or not to the BS via the LTE communication, when the UE detects the disconnection or receives a status report request from the BS via the LTE communication. The BS transmits the status report request in response to the first message. Accordingly, the BS retransmits a LTE PDU which was transmitted via the WLAN and is indicated as not received by the UE in the status report via the LTE communication.

In one example, the UE may receive a status report from the BS via the LTE communication, wherein the status report is transmitted in response to the second message and indicates which of the at least one first LTE PDU is received or not by the BS. The UE may retransmit one of the at least one first LTE PDU according to the status report.

In one example, the first configuration message includes a time period. The UE transmits the second message, after the UE continuously detects that a connection to the WLAN is lost for the time period. This avoids unnecessary transmission of the first message due to that the connection to the WLAN is suddenly lost, and is recovered in a short time period.

Figure 5:
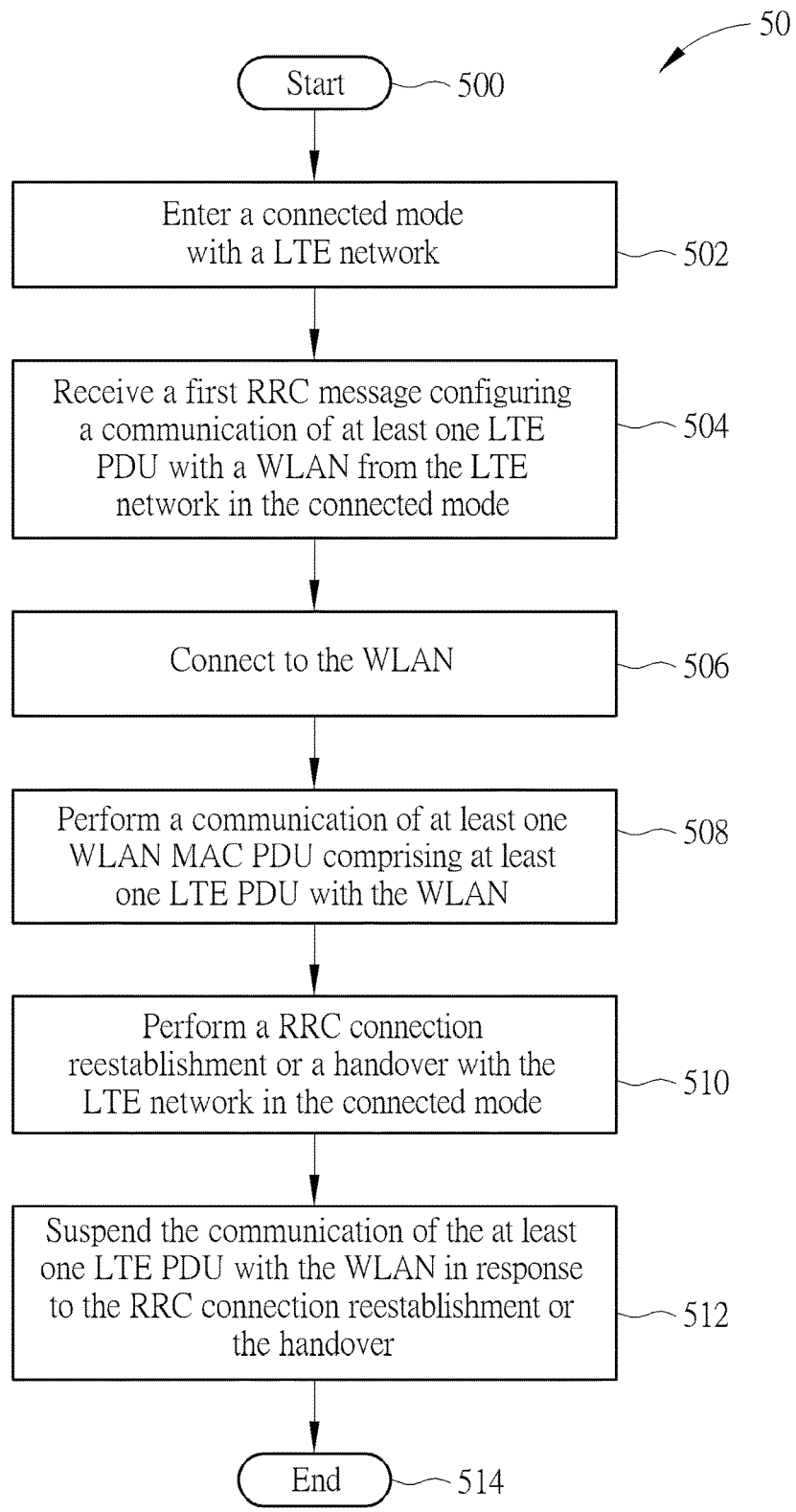
FIG. 5 is a flowchart of a process according to an example of the present invention.

FIG. 5 is a flowchart of a process 50 according to an example of the present invention. The process 50 may be utilized in a UE (e.g., the UE 100), for aggregating LTE and WLAN (e.g., WiFi) communications. The process 50 may be compiled into the program code 214 and includes the following steps:

Step 500: Start.
Step 502: Enter a connected mode with a LTE network.
Step 504: Receive a first RRC message configuring a communication of at least one LTE PDU with a WLAN from the LTE network in the connected mode.
Step 506: Connect to the WLAN.
Step 508: Perform a communication of at least one WLAN MAC PDU comprising at least one LTE PDU with the WLAN.
Step 510: Perform a RRC connection reestablishment or a handover with the LTE network in the connected mode.
Step 512: Suspend the communication of the at least one LTE PDU with the WLAN in response to the RRC connection reestablishment or the handover.

Step 514: End.

According to the process 50, the UE enters a connected mode with a LTE network, and receives a first RRC message configuring a communication of at least one LTE PDU with a WLAN (e.g., the AP 104) from the LTE network (e.g., the BS 102) in the connected mode. The UE connects to the WLAN, and performs a communication of at least one WLAN MAC PDU comprising at least one LTE PDU with the WLAN. Then, the UE performs a RRC connection reestablishment or a handover with the LTE network in the connected mode, and suspends the communication of the at least one LTE PDU with the WLAN in response to the RRC connection reestablishment or the handover, since the LTE network may drop the at least one LTE PDU before completing the RRC connection reestablishment or handover.

An example is illustrated according to the process 50 as follows. A UE has a RRC connection with a BS of the LTE network (i.e., is in a RRC connected mode) and at least one DRB configured by the BS. When the UE is configured with the LTE-WLAN aggregation, the UE transmits LTE PDU(s) to the BS via WLAN and/or receives LTE PDU(s) from the BS via the WLAN. The LTE PDU(s) may be LTE PDCP PDU(s), RLC PDU(s) or MAC PDU(s) which is currently defined or newly defined for the LTE-WLAN aggregation. When the UE detects a RLF on LTE communication with the BS, the UE performs a RRC connection reestablishment and suspends the communication of the LTE PDU(s) with the WLAN. When the UE performs a handover in the LTE network, e.g., from a LTE cell of the BS to another LTE cell of the BS or another BS, the UE suspends the communication of the LTE PDU(s) with the WLAN.

When the UE suspends the communication of LTE PDU(s) with the WLAN, the UE does not transmit any LTE PDU via the WLAN. Even a LTE PDU has been transmitted but not successfully acknowledged, the UE aborts a retransmission of the LTE PDU via the WLAN. In one example, the UE may be equipped with a LTE modem and a WLAN modem. The LTE modem signals to the WLAN modem to suspend the communication of LTE PDU(s) with the WLAN. The WLAN modem aborts (re)transmission of any LTE PDU received from the LTE modem. In another example, the LTE modem signals to an application processor of the UE, and the application processor signals to the WLAN modem to abort (re)transmission of any LTE PDU received from the LTE modem.

The first RRC message (e.g., RRCConnectionReconfiguration) may include a WLAN configuration including a SSID of the WLAN, a BSSID of the WLAN, an ESSID of the WLAN and/or a HESSID of the WLAN, and configures the LTE-WLAN aggregation (e.g. transmission/reception of LTE PDU(s) (e.g., PDCP PDU(s)) via the WLAN).

If a BS assisted authentication procedure is used, the first RRC message may include at least one parameter for the UE to derive a pairwise master key (PMK). The UE derives an encryption key according to the PMK by performing a first handshake procedure. Then, the UE encrypts data included in a WLAN MAC PDU (MPDU) transmitted via the WLAN according to the encryption key, and/or decrypts the data included in a MPDU received via the WLAN according to the encryption key. If the BS assisted authentication procedure is not used, the first RRC message may not include all of the at least one parameter for the UE to derive the PMK, and the UE performs an Extensible Authentication Protocol (EAP) Authentication and Key Agreement (AKA) procedure with the WLAN.

Realization of the process 50 is not limited to the above description. The following examples may be applied to the process 40.

In one example, the UE keeps connecting to the WLAN for communicating non-LTE PDU(s) (e.g., IP packets) with the WLAN, when performing the RRC connection reestablishment or the handover. The non-LTE PDU(s) is sent from the application processor to the WLAN modem for transmitting or from the WLAN modem to the application processor for receiving directly, and the LTE modem is not involved. Specifically, the UE may suspend the communication of non-LTE PDU(s) in case of the RRC connection reestablishment or the handover, if the UE needs to perform an EAP AKA procedure. Otherwise, the UE does not suspend the communication of non-LTE PDU(s) in case of the RRC connection reestablishment or handover.

In one example, the UE suspends the communication of the at least one LTE PDU with the WLAN by disconnecting from the WLAN. Specifically, the UE disconnects it from the WLAN, when the UE does not need to communicate non-LTE PDU(s) (e.g., IP packet(s)) with the WLAN. The UE disconnects it from the WLAN by not monitoring a beacon of the WLAN. Furthermore, the UE may turn off a WLAN transceiver of the WLAN modem. Alternatively, the UE may configure the WLAN transceiver transferring to a sleep mode. That is, the power supplied to the WLAN transceiver in the sleep mode is lower than that supplied to a normal mode. Thus, the UE saves battery power due to turning off the WLAN transceiver or configuring the WLAN transceiver transferring to the sleep mode.

Further, the UE may resume the communication of the at least one LTE PDU with the WLAN, after performing the RRC connection reestablishment or the handover successfully.

In one example, before the UE resumes the communication of the at least one LTE PDU with the WLAN, the UE performs an association procedure or a re-association procedure to the WLAN or another WLAN. Specifically, the UE performs the association procedure or the re-association procedure to the WLAN or the other WLAN, after the UE performs the RRC connection reestablishment and receives a second RRC message (e.g., RRCConnectionReconfiguration) configuring the WLAN or the other WLAN in the LTE-WLAN aggregation. The UE performs the association procedure or the re-association procedure to the WLAN or the other WLAN, after the UE performs the handover successfully. The UE may perform a second handshake procedure to generate a second encryption key, after performing the association procedure or the re-association procedure. After the association procedure, the re-association procedure or the second handshake procedure, the UE resumes the communication of the LTE PDU(s) with the WLAN. That is, the UE transmits a LTE PDU via the WLAN or processes a LTE PDU received via the WLAN.

In one example, the UE derives a first PMK according to the first RRC message, and may derive a first encryption key according to the first PMK. Accordingly, the UE may encrypt a first WLAN MAC service data unit (SDU) which comprises a first LTE PDU using the first encryption key into a first encrypted WLAN MAC SDU, and may transmit a first WLAN MAC PDU comprising the first encrypted WLAN MAC SDU to the WLAN. The UE may receive a second WLAN MAC PDU comprising a second encrypted WLAN MAC SDU which comprises a second LTE PDU from the WLAN and decrypts the second encrypted WLAN MAC SDU using the first encryption key.

In one example, the UE derives a second PMK according to a third RRC message (e.g., RRCConnectionReconfiguration) of the handover procedure or the second RRC message. Accordingly, the UE derives a second encryption key according to the second PMK.

In one example, the UE encrypts a third WLAN MAC SDU into a third encrypted WLAN MAC SDU which comprises a third LTE PDU according to the second encryption key. Then, the UE transmits a third WLAN MAC PDU which comprises the third encrypted WLAN MAC SDU to the WLAN, after resuming the communication of the at least one LTE PDU with the WLAN.

In one example, the UE receives a fourth WLAN MAC PDU comprising a fourth encrypted WLAN MAC SDU which comprises a fourth LTE PDU from the WLAN. Then, the UE decrypts the fourth encrypted WLAN MAC SDU according to the second encryption key, after resuming the communication of the at least one LTE PDU with the WLAN.

In one example, the UE may discard a LTE PDU received from the WLAN, when performing the RRC connection reestablishment or the handover. In another example, the UE may discard a LTE PDU of a radio bearer received from the WLAN, when performing a PDCP reestablishment procedure.

Figure 6:
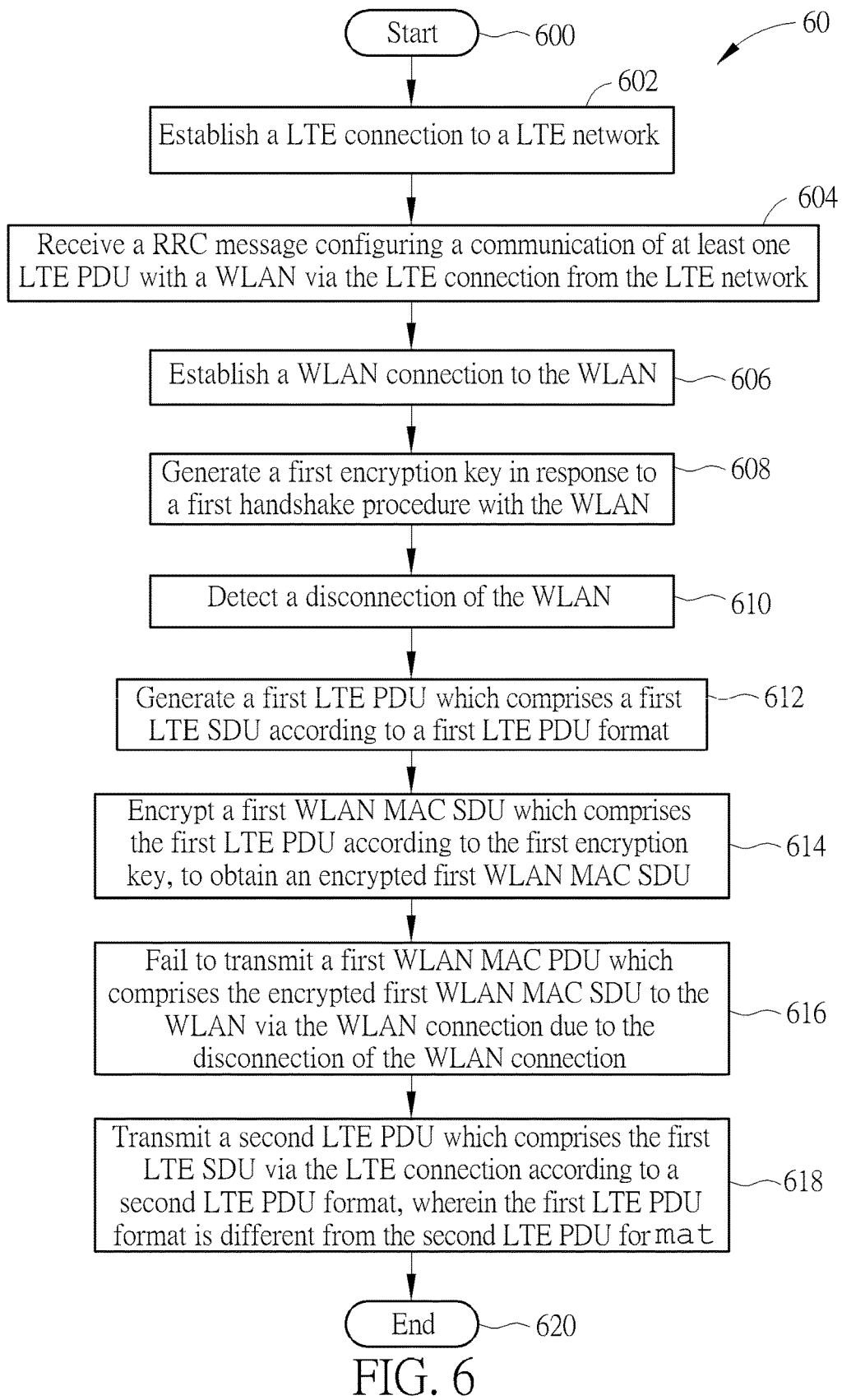
FIG. 6 is a flowchart of a process according to an example of the present invention.

FIG. 6 is a flowchart of a process 60 according to an example of the present invention. The process 60 may be utilized in a UE (e.g., the UE 100), for aggregating LTE and WLAN (e.g., WiFi) communications. The process 60 may be compiled into the program code 214 and includes the following steps:

Step 600: Start.
Step 602: Establish a LTE connection to a LTE network.
Step 604: Receive a RRC message configuring a communication of at least one LTE PDU with a WLAN via the LTE connection from the LTE network.
Step 606: Establish a WLAN connection to the WLAN.
Step 608: Generate a first encryption key in response to a first handshake procedure with the WLAN.
Step 610: Detect a disconnection of the WLAN.
Step 612: Generate a first LTE PDU which comprises a first LTE SDU according to a first LTE PDU format.
Step 614: Encrypt a first WLAN MAC SDU which comprises the first LTE PDU according to the first encryption key, to obtain an encrypted first WLAN MAC SDU.
Step 616: Fail to transmit a first WLAN MAC PDU which comprises the encrypted first WLAN MAC SDU to the WLAN via the WLAN connection due to the disconnection of the WLAN connection.
Step 618: Transmit a second LTE PDU which comprises the first LTE SDU via the LTE connection according to a second LTE PDU format, wherein the first LTE PDU format is different from the second LTE PDU format.
Step 620: End.

According to the process 60, the UE establishes a LTE connection to a LTE network, and receives a RRC message configuring communication of at least one LTE PDU with a WLAN (e.g., the AP 104) via the LTE connection from the LTE network (e.g., the BS 102). The UE establishes a WLAN connection to the WLAN, and generates a first encryption key in response to a first handshake procedure with the WLAN. After a while, the UE detects a disconnection of the WLAN. Accordingly, the UE may suspend the communication of the at least one LTE PDU with the WLAN. Before detecting the disconnection, the UE encrypts a first WLAN MAC SDU which comprises the first LTE PDU according to the first encryption key, to obtain an encrypted first WLAN MAC SDU. The UE fails to transmit a first WLAN MAC PDU which comprises the encrypted first WLAN MAC SDU to the WLAN via the WLAN connection due to the disconnection of the WLAN connection. The UE transmits a second LTE PDU which comprises the first LTE SDU via the LTE connection according to a second LTE PDU format, wherein the first LTE PDU format is different from the second LTE PDU format.

An example is illustrated according to the process 60 as follows. A UE has a RRC connection with the BS and at least one radio bearer configured by the BS. When the UE is configured by the BS to perform the LTE-WLAN aggregation, the UE transmits LTE PDU(s) of the at least one DRB via the WLAN, and/or receive LTE PDU(s) of the at least one DRB via the WLAN. The LTE PDU(s) may have a new PDU format which is defined for transmission in a WLAN MAC PDU. That is, the new PDU format (i.e., the LTE PDU format) may be different from an existent LTE PDU format (i.e., the second LTE PDU format).

The RRC message (e.g., RRCConnectionReconfiguration) may include a WLAN configuration including a SSID of the WLAN, a BSSID of the WLAN, an ESSID of the WLAN and/or a HESSID of the WLAN, and configures the LTE-WLAN aggregation (e.g. transmission/reception of LTE PDU(s) (e.g., PDCP PDU(s)) via the WLAN).

If a BS assisted authentication procedure is used, the RRC message may include at least one parameter for the UE to derive a PMK. The UE derives an encryption key according to the PMK by performing a first handshake procedure. Then, the UE encrypts data included in a WLAN MPDU transmitted via the WLAN according to the encryption key, and/or decrypts the data included in a WLAN MAC PDU (MPDU) received via the WLAN according to the encryption key. If the BS assisted authentication procedure is not used, the RRC message may not include all of the at least one parameter for the UE to derive the PMK, and the UE performs an EAP AKA procedure with the WLAN.

Before the UE transmits the second LTE PDU, the UE may transmit a scheduling request (SR) for requesting the BS to allocate a UL grant for UL transmission if the UE does not have the UL grant allocated by the BS.

It is noted that the disconnection of the WLAN connection may not impact the LTE connection in the LTE-WLAN aggregation. On the other hand, when the UE detects a RLF on the LTE connection, the UE may suspend transmission on the WLAN connection via the WLAN. That is, the RLF on the LTE connection impacts communication on the WLAN connection.

Realization of the process 60 is not limited to the above description. The following examples may be applied to the process 50.

In one example, the UE may detect the WLAN after detecting the disconnection of the WLAN connection. Then, the UE may resume the communication of the at least one LTE PDU with the WLAN, after detecting the WLAN connection. In one example, the UE resumes transmission via the WLAN after detecting a beacon of the WLAN or detecting that a signal strength of the beacon is larger or equal to a threshold. In another example, after detecting beacon of the WLAN or detecting that the signal strength of the beacon is larger or equal to the threshold, the UE may perform an association procedure or a re-association procedure. Then, the UE resumes the communication with the WLAN, after performing the association procedure or the re-association procedure. In one example, the RRC message may include a timer value to control the UE whether to perform the association procedure or the re-association procedure. The UE starts a timer with the timer value, when detecting that the WLAN is lost. If the UE detects the WLAN before the timer expires, the UE does not need to perform the association procedure or the re-association procedure. If the UE detects the WLAN upon or after the timer expires, the UE performs the association procedure or the re-association procedure.

Further, the UE may generate a third LTE PDU which comprises a second LTE SDU according to the first PDU format, and may encrypt a second WLAN MAC SDU which comprises the third LTE PDU according to the first encryption key. Accordingly, the UE may transmit a second WLAN MAC PDU which comprises the encrypted second WLAN MAC SDU.

In one example, the UE may detect the WLAN after detecting the disconnection of the WLAN. The UE may perform an association procedure or a re-association procedure to the WLAN, after detecting the WLAN. The UE may perform a second handshake procedure to generate a second encryption key, after performing the association procedure or the re-association procedure. Then, the UE generates a third LTE PDU comprising a third LTE SDU according to the first PDU format, and may encrypt a third WLAN MAC SDU which comprises the third LTE PDU using the second encryption key, to obtain an encrypted third WLAN MAC SDU. The UE transmits a third WLAN MAC PDU which comprises the encrypted third WLAN MAC SDU. Accordingly, the UE may receive a fourth WLAN MAC PDU, and decrypts an encrypted fourth WLAN MAC SDU in the fourth WLAN MAC PDU using the second encryption key.

In one example, the RRC message may include a configuration configuring the UE how to transmit the at least one LTE PDU of a DRB. In one example, the BS may configure the UE to transmit LTE PDUs via LTE or WLAN as more as possible. If the UE is configured to transmit LTE PDU(s) of a DRB via the WLAN as more as possible, the UE shall transmit the LTE PDU(s) as more as possible via the WLAN. Thus, the BS can offload some traffic of the UE to the WLAN. In one or more exceptional cases (e.g. the WLAN connection is lost), the UE is allowed to transmit the LTE PDU(s) via the LET network. If the UE is configured to transmit LTE PDU(s) of a DRB via the LTE network as more as possible, the UE shall transmit the LTE PDU(s) as more as possible via the LTE network. In addition, the UE may be configured by the BS to only transmit LTE PDU(s) of a DRB via the WLAN. In this case, the UE may inform the BS that the WLAN is lost in a RRC message via the LTE network. Thus, the eNB may reconfigure the UE to transmit the LTE PDU(s) of the DRB via the LTE network.

In one example, the second LTE PDU may be transmitted, when receiving a first STATUS PDU which indicates the first LTE SDU is missing from the LTE network. In one example, the UE may transmit a second STATUS PDU which indicates the first LTE SDU is not received to the LTE network.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above maybe compiled into the program code 214. "communicate" means transmit and/or receive, and "communication" means "transmission" and/or "reception".

To sum up, the present invention provides a communication device and method of handling LTE-WLAN aggregation. A UE operates properly according to the present invention, when a RLF on a LTE connection and/or a disconnection on a WLAN occurs. Thus, power consumption of the UE is saved, and throughput of the UE is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling long-term evolution (LTE)-wireless local area network (WLAN) aggregation, comprising:
   a non-transitory memory; and
   a processing circuit, coupled to the non-transitory memory, wherein the non-transitory memory stores, and the processing circuit is configured to execute instructions of:
   connecting to a base station (BS) via LTE communication;
   detecting a radio link failure on the LTE communication;
   stopping transmission/reception of at least one first LTE protocol data unit (PDU) via a WLAN in response to the radio link failure, if the WLAN is configured by the BS for the transmission/reception of the at least one first LTE PDU with the BS via the WLAN;
   keeping transmission/reception of at least one non-LTE PDU via the WLAN in response to the radio link failure, if the WLAN is not configured by the BS for the transmission/reception of the at least one first LTE PDU with the BS via the WLAN;
   transmitting a message indicating support of LTE-WLAN aggregation to the BS via the LTE communication;
   receiving a first configuration message configuring the transmission/reception of the at least one first LTE PDU via the WLAN and a WLAN configuration;
   communicating the at least one first LTE PDU from the BS via the WLAN according to the WLAN configuration; and
   transmitting a first status report indicating which of the at least one first LTE PDU is received or not to the BS via the LTE communication, when the communication device detects a disconnection of the WLAN.

2. The communication device of claim 1, wherein the non-transitory memory further stores an instruction of:
   performing a radio resource control (RRC) connection reestablishment procedure in response to the radio link failure.

3. The communication device of claim 1, wherein a LTE modem side of the communication device sends an indication to an application side of the communication device in response to the radio link failure, and the application side determines whether to stop or keep the transmission/reception of the at least one first LTE PDU via the WLAN in response to the indication and according to whether the WLAN is configured by the BS or not.

4. The communication device of claim 1, wherein a LTE modem side of the communication device indicates a WLAN modem side of the communication device in response to the radio link failure to stop the transmission/reception of the at least one first LTE PDU via the WLAN.

5. The communication device of claim 1, wherein the non-transitory memory further stores an instruction of:
   transmitting a second message indicating the disconnection of the WLAN to the BS via the LTE communication, when the communication device detects the disconnection.

6. The communication device of claim 5, wherein the non-transitory memory further stores an instruction of:
   transmitting a third message indicating that a connection of the WLAN is recovered to the BS via the LTE communication, when the communication device reconnects to the WLAN or another WLAN having an identification the same as an identification of the WLAN.

7. The communication device of claim 5, wherein the non-transitory memory further stores an instruction of:
   stopping the transmission/reception of the at least one first LTE PDU via the WLAN, when the communication detects the disconnection.

8. The communication device of claim 5, wherein the non-transitory memory further stores an instruction of:
   receiving a second configuration message for releasing the WLAN configuration, wherein the other configuration message is transmitted from the BS via the LTE communication in response to the second message.

9. The communication device of claim 5, wherein the non-transitory memory further stores an instruction of:
   receiving a second status report from the BS via the LTE communication, wherein the second status report is transmitted in response to the second message and indicates which of the at least one first LTE PDU is received or not by the BS.

10. A communication device for handling long-term evolution (LTE)-wireless local area network (WLAN) aggregation, comprising:
    a non-transitory memory; and
    a processing circuit, coupled to the non-transitory memory, wherein the non-transitory memory stores, and the processing circuit is configured to execute instructions of:
    entering a connected mode with a LTE network;
    receiving a first radio resource control (RRC) message configuring a communication of at least one LTE protocol data unit (PDU) with a WLAN from the LTE network in the connected mode;
    connecting to the WLAN;
    performing a communication of at least one WLAN media access control (MAC) PDU comprising the at least one LTE PDU with the WLAN;
    performing a RRC connection reestablishment or a handover with the LTE network in the connected mode;
    suspending the communication of the at least one LTE PDU with the WLAN in response to the RRC connection reestablishment or the handover;
    deriving a first pairwise master key (PMK) according to the RRC message;
    deriving a first encryption key according to the first PMK;
    encrypting a first WLAN MAC service data unit (SDU) which comprises a first LTE PDU using the first encryption key into a first encrypted WLAN MAC SDU, and transmitting a first WLAN MAC PDU comprising the first encrypted WLAN MAC SDU to the WLAN; and/or
    receiving a second WLAN MAC PDU comprising a second encrypted WLAN MAC SDU which comprises a second LTE PDU from the WLAN, and decrypting the second encrypted WLAN MAC SDU using the first encryption key;
    deriving a second PMK according to a second RRC message of the handover or the first RRC message after the RRC connection reestablishment;
    deriving a second encryption key according to the second PMK;
    encrypting a third WLAN MAC SDU into a third encrypted WLAN MAC SDU which comprises a third LTE PDU according to the second encryption key, and transmitting a third WLAN MAC PDU which comprises the third encrypted WLAN MAC SDU to the WLAN, after resuming the communication of the at least one LTE PDU with the WLAN; and
    receiving a fourth WLAN MAC PDU comprising a fourth encrypted WLAN MAC SDU which comprises a fourth LTE PDU from the WLAN, and decrypting the fourth encrypted WLAN MAC SDU according to the second encryption key, after resuming the communication of the at least one LTE PDU with the WLAN.

11. The communication device of claim 10, wherein the instruction of suspending the communication of the at least one LTE PDU with the WLAN comprises:
    disconnecting from the WLAN.

12. The communication device of claim 10, wherein the non-transitory memory further stores an instruction of:
    resuming the communication of the at least one LTE PDU with the WLAN, after performing the RRC connection reestablishment or the handover successfully.

13. The communication device of claim 12, wherein the non-transitory memory further stores an instruction of:
    performing an association procedure or a re-association procedure to the WLAN or another WLAN, after performing the RRC connection reestablishment or the handover successfully and before resuming the communication of the at least one LTE PDU with the WLAN.

14. A communication device for handling long-term evolution (LTE)-wireless local area network (WLAN) aggregation, comprising:
    a non-transitory memory; and
    a processing circuit, coupled to the non-transitory memory, wherein the non-transitory memory stores, and the processing circuit is configured to execute instructions of:
    establishing a LTE connection to a LTE network;
    receiving a radio resource control (RRC) message configuring a communication of at least one LTE protocol data unit (PDU) with a WLAN via the LTE connection from the LTE network;
    establishing a WLAN connection to the WLAN;
    generating a first encryption key in response to a first handshake procedure with the WLAN;
    detecting a disconnection of the WLAN connection;
    generating a first LTE PDU which comprises a first LTE service data unit (SDU) according to a first LTE PDU format;
    encrypting a first WLAN media access control (MAC) SDU which comprises the first LTE PDU according to the first encryption key, to obtain an encrypted first WLAN MAC SDU;
    failing to transmit a first WLAN MAC PDU which comprises the encrypted first WLAN MAC SDU to the WLAN via the WLAN connection due to the disconnection of the WLAN connection; and transmitting a second LTE PDU which comprises the first LTE SDU via the LTE connection according to a second LTE PDU format, wherein the first LTE PDU format is different from the second LTE PDU format.

15. The communication device of claim 14, wherein the non-transitory memory further stores instructions of:
detecting the WLAN after detecting the disconnection of the WLAN connection; and
resuming the communication of the at least one LTE PDU with the WLAN, after detecting the WLAN.

16. The communication device of claim 14, wherein the non-transitory memory further stores instructions of:
detecting the WLAN after detecting the disconnection of the WLAN;
performing an association procedure or a re-association procedure to the WLAN, after detecting the WLAN;
performing a second handshake procedure to generate a second encryption key, after performing the association procedure or the re-association procedure;
generating a third LTE PDU comprising a third LTE SDU according to the first PDU format;
encrypting a third WLAN MAC SDU which comprises the third LTE PDU using the second encryption key, to obtain an encrypted third WLAN MAC SDU, and transmitting a third WLAN MAC PDU which comprises the encrypted third WLAN MAC SDU; and/or
receiving a fourth WLAN MAC PDU, and decrypting an encrypted fourth WLAN MAC SDU in the fourth WLAN MAC PDU using the second encryption key.

* * * * *